US012591080B2

(12) United States Patent
Goto et al.

(10) Patent No.: US 12,591,080 B2
(45) Date of Patent: Mar. 31, 2026

(54) POLARIZING PLATE

(71) Applicant: OKURA INDUSTRIAL CO., LTD., Kagawa (JP)

(72) Inventors: Keisuke Goto, Kagawa (JP); Kazunori Noma, Kagawa (JP); Hiroyuki Morimoto, Kagawa (JP); Takahisa Yano, Kagawa (JP)

(73) Assignee: OKURA INDUSTRIAL CO., LTD., Kagawa (JP)

( * ) Notice: Subject to any disclaimer, the term of this patent is extended or adjusted under 35 U.S.C. 154(b) by 218 days.

(21) Appl. No.: 18/262,452

(22) PCT Filed: Jan. 26, 2022

(86) PCT No.: PCT/JP2022/002859
§ 371 (c)(1),
(2) Date: Jul. 21, 2023

(87) PCT Pub. No.: WO2022/172755
PCT Pub. Date: Aug. 18, 2022

(65) Prior Publication Data
US 2024/0085591 A1 Mar. 14, 2024

(30) Foreign Application Priority Data
Feb. 9, 2021 (JP) ................................. 2021-019045

(51) Int. Cl.
*G02B 1/04* (2006.01)
*C08J 5/12* (2006.01)
*G02B 5/30* (2006.01)

(52) U.S. Cl.
CPC ................. *G02B 1/04* (2013.01); *C08J 5/122* (2013.01); *C08J 2329/04* (2013.01); *G02B 5/3025* (2013.01)

(58) Field of Classification Search
None
See application file for complete search history.

(56) References Cited

U.S. PATENT DOCUMENTS

2020/0164625 A1 5/2020 Ishizeki

FOREIGN PATENT DOCUMENTS

| JP | 2009-098465 A | 5/2009 |
| JP | 2009-237398 A | 10/2009 |
| JP | 2009-237460 A | 10/2009 |

(Continued)

OTHER PUBLICATIONS

English translation of Fujino et al. (TW 2020-24884) (Year: 2020).*

(Continued)

*Primary Examiner* — Ronak C Patel
(74) *Attorney, Agent, or Firm* — Rankin, Hill & Clark LLP

(57) ABSTRACT
To provide a novel polarizing plate that suppresses poor appearance caused by thermal shrinkage of a polarizing film and is excellent in durability. There is provided a polarizing plate including: a polarizing film composed of a polyvinyl alcohol-based resin; and a translucent support substrate laminated on at least one surface of the polarizing film through a bonding layer, in which the bonding layer is composed of a molecular bonding agent that bonds the polarizing film and the support substrate by a chemical bond.

5 Claims, 1 Drawing Sheet

(56)                    References Cited

FOREIGN PATENT DOCUMENTS

| JP | 2009-258404 | A | 11/2009 |
|----|-------------|----|---------|
| JP | 2010-254793 | A | 11/2010 |
| JP | 2017-044836 | A | 3/2017 |
| JP | 2019-096488 | A | 6/2019 |
| JP | 2019-161054 | A | 9/2019 |
| JP | 2020-142437 | A | 9/2020 |
| WO | 2013/154139 | A1 | 10/2013 |
| WO | 2013/184941 | A1 | 12/2013 |
| WO | 2019/044481 | A1 | 3/2019 |

OTHER PUBLICATIONS

English translation of Matsuo et al. (JP 2009-098465) (Year: 2009).*
English translation of Morita et al. (JP 2020-142437). (Year: 2020).*
Korean Office Action dated Jun. 18, 2025, in corresponding Korean Application No. 10-2023-7029066.
Extended European Search Report dated Nov. 15, 2024, in the corresponding European Application No. 22752584.7.
Taiwan Office Action posted Feb. 21, 2025, in corresponding Taiwan Application No. 11420193720.
International Search Report dated Apr. 26, 2022 filed in PCT/JP2022/002859.
Japanese Office Action mailed on Apr. 9, 2024, for the corresponding Japanese Patent Application No. 2022-581305.
Japanese Decision of refusal mailed on Jul. 9, 2024, for the corresponding Japanese Patent Application No. 2022-581305.

* cited by examiner

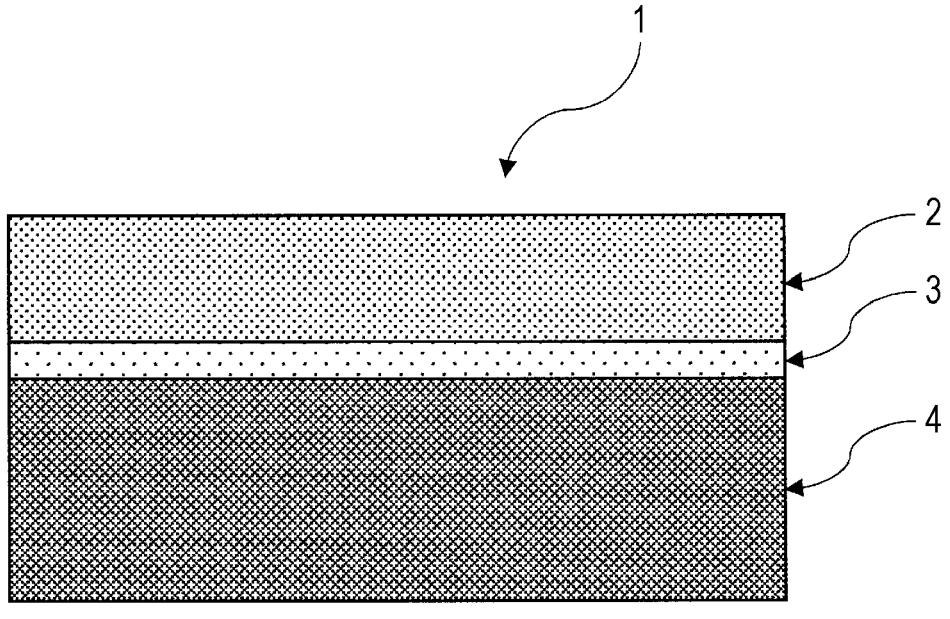

POLARIZING PLATE

TECHNICAL FIELD

The present invention relates to a polarizing plate and more particularly to a polarizing plate obtained by laminating a polarizing film composed of a polyvinyl alcohol-based resin and a translucent support substrate through a molecular bonding agent.

BACKGROUND ART

A conventionally known optical member that transmits light polarized in a specific direction is a polarizing plate having a configuration in which a polarizing film (PVA polarizing film) composed of a polyvinyl alcohol-based resin is laminated on a translucent support substrate such as glass or quartz crystal through an adhesive.

CITATION LIST

Patent Literature

Patent Literature 1: WO 13/154139 A

SUMMARY OF INVENTION

Problems to be Solved by Invention

The PVA polarizing film used in the polarizing plate is a film in which iodine or a dichroic dye is adsorbed and oriented to a uniaxially stretched polyvinyl alcohol-based resin film. Such a PVA polarizing film absorbs light parallel to an absorption axis from its characteristics and therefore has a problem in that shrinkage stress is generated in a stretching direction in response to an increase in temperature of the PVA polarizing film caused by absorbed light energy, and thermal shrinkage occurs. When the PVA polarizing film is thermally shrunk, deformation in appearance (or poor appearance) such as irregularities and wrinkles occurs in the PVA polarizing film. In an image display device such as a liquid crystal display, the PVA polarizing film in which poor appearance occurs causes poor image or a decrease in contrast.

On the other hand, an image display device or the like is required to have high luminance and high definition, and a light source having a large or high numerical value in light flux, luminous intensity, luminance, light density, and the like has been used in recent years. When such a light source is used, the light energy absorbed by the PVA polarizing film increases, so that the poor appearance caused by the thermal shrinkage of the PVA polarizing film becomes more remarkable.

The present invention has been made in view of such a problem and has as its object to provide a novel polarizing plate that suppresses the poor appearance caused by the thermal shrinkage of the PVA polarizing film and is excellent in durability.

Solution to Problems

The present inventors conducted intensive studies for suppressing poor appearance caused by thermal shrinkage of a polarizing film in a polarizing plate. As a result, it was found that use of a molecular bonding technique of bonding a PVA polarizing film and a support substrate by a chemical bond enables firmer adhesion between the PVA polarizing film and the support substrate as well as efficient dissipation of heat generated in the PVA polarizing to the support substrate so that the thermal load on the PVA polarizing film can be reduced. Thus, the present invention has been accomplished.

According to the present invention, there is provided a polarizing plate including: a polarizing film composed of a polyvinyl alcohol-based resin; and a translucent support substrate laminated on at least one surface of the polarizing film through a bonding layer, in which the bonding layer is composed of a molecular bonding agent that bonds the polarizing film and the support substrate by a chemical bond.

Also, according to the present invention, there is provided a method for producing a polarizing plate, including: a step of providing a molecular bonding agent on a surface of a polarizing film composed of a polyvinyl alcohol-based resin and/or a translucent support substrate; a step of laminating the polarizing film and/or the support substrate through the molecular bonding agent present on the surface of the polarizing film and/or the support substrate; and a step of thermocompression-bonding the polarizing film and the support substrate to bond the polarizing film and the support substrate by a chemical bond.

Effects of Invention

According to the polarizing plate of the present invention, the PVA polarizing film and the support substrate are bonded by a chemical bond, which can reduce the heat load on the PVA polarizing film and suppress poor appearance caused by thermal shrinkage of the PVA polarizing film. Also, according to the polarizing plate of the present invention, the PVA polarizing film and the support substrate are bonded by a chemical bond, which enables firm adhesion between the support substrate and the polarizing film to suppress thermal shrinkage of the PVA polarizing film and can suppress poor appearance caused by the thermal shrinkage of the PVA polarizing film.

BRIEF DESCRIPTION OF DRAWINGS

FIG. 1 is a cross-sectional view illustrating an example of the polarizing plate according to the present invention.

DESCRIPTION OF EMBODIMENTS

Hereinafter, the present invention will be described in detail. It is noted that the present invention is not limited to the following forms, and various forms can be made within a scope that exerts the effects of the present invention.
[Polarizing Plate]

FIG. 1 is a view illustrating an example of the polarizing plate according to the present invention. A polarizing plate 1 illustrated in FIG. 1 includes a polarizing film 2 composed of a polyvinyl alcohol-based resin and a support substrate 4 laminated on at least one surface of the polarizing film 2 through a bonding layer 3. More specifically, the polarizing film 2 and the support substrate 4 are laminated through the bonding layer 3 composed of a molecular bonding agent using a molecular bonding technique of bonding the polarizing film 2 and the support substrate 4 by a chemical bond. The molecular bonding technique is a technique of bonding members by a chemical bond with one or several molecular layers. A polarizing plate bonded by the molecular bonding technique has higher thermal conductivity than that in known bonding by an intermolecular force and can reduce the thermal load on the polarizing film, so that poor appearance caused by thermal shrinkage of the polarizing film can be suppressed. In addition, since the polarizing plate bonded by the molecular bonding technique is directly bonded by a chemical bond, the adhesive force is higher than that in known bonding by an intermolecular force, and the polarizing film and the support substrate can firmly adhere to each other. Therefore, the thermal shrinkage of the polarizing film can be suppressed to suppress poor appearance. Thus, the polarizing plate bonded by the molecular bonding technique has the high durability of maintaining the performance of the polarizing film for a long period of time. Although not illustrated, another support substrate may be provided on the other surface of the polarizing film through a bonding layer composed of a molecular bonding agent.

[Polarizing Film]

A polarizing film has absorption dichroism at any wavelength of 380 to 780 nm and is formed of a polyvinyl alcohol-based resin film. Examples of the polarizing film having absorption dichroism at any wavelength of 380 to 780 nm include a polyvinyl alcohol-based resin film (H-type polarizing film) in which iodine and/or a dichroic dye are adsorbed and oriented and a polyvinyl alcohol-based resin film (K-type polarizing film) in which a polyvinyl alcohol resin is dehydrated to form a light-absorbing vinylene block segment in a polymer.

The H-type polarizing film composed of a polyvinyl alcohol-based resin to which iodine and/or a dichroic dye are adsorbed and oriented can be produced by, for example, a method including a step of uniaxially stretching a polyvinyl alcohol-based resin film, a step of dyeing the polyvinyl alcohol-based resin film with iodine and/or a dichroic dye so that the iodine and/or the dichroic dye is adsorbed, a step of crosslinking the polyvinyl alcohol-based resin film on which iodine and/or a dichroic dye are adsorbed with a crosslinking liquid such as an aqueous boric acid solution, and a step of washing the polyvinyl alcohol-based resin film with water.

As the polyvinyl alcohol-based resin, a saponified polyvinyl acetate-based resin can be used. Examples of the polyvinyl acetate-based resin include, in addition to polyvinyl acetate which is a homopolymer of vinyl acetate, a copolymer with another monomer copolymerizable with vinyl acetate. Examples of the other monomer copolymerizable with vinyl acetate include unsaturated carboxylic acids, olefins, vinyl ethers, unsaturated sulfonic acids, and (meth)acrylamides having an ammonium group.

The saponification degree of the polyvinyl alcohol-based resin is usually 85 to 100 mol % and preferably 98 mol % or more. The polyvinyl alcohol-based resin may be modified. For example, polyvinyl formal or polyvinyl acetal modified with aldehydes can also be used. The average polymerization degree of the polyvinyl alcohol-based resin is usually 1000 to 10000 and preferably 1500 to 5000. The average polymerization degree of the polyvinyl alcohol-based resin can be obtained in accordance with JIS K 6726.

A film formed with such a polyvinyl alcohol-based resin is used as a raw material film of a polarizing film. The method for forming a film of the polyvinyl alcohol-based resin is not particularly limited, and a known method is employed. The thickness of the polyvinyl alcohol-based raw material film is not particularly limited but, for example, preferably 10 to 200 µm.

The uniaxial stretching of the polyvinyl alcohol-based resin film can be performed before, simultaneously with, or after dyeing with iodine and/or a dichroic dye. When uniaxial stretching is performed after dyeing, this uniaxial stretching may be performed before or during the crosslinking treatment. Also, the uniaxial stretching may be performed in a plurality of these stages. The uniaxial stretching may be performed between rolls having different circumferential speeds or may be performed using heat rolls. The uniaxial stretching may be dry stretching of stretching in the air or may be wet stretching of stretching in a state in which the polyvinyl alcohol-based resin film is swollen with a solvent or water. The draw ratio is usually 3 to 8 times.

An example of the method for dyeing the polyvinyl alcohol-based resin film with iodine and/or a dichroic dye is a method of immersing the film in an aqueous solution that contains iodine and/or a dichroic dye. The polyvinyl alcohol-based resin film is preferably subjected to an immersion treatment in water before the dyeing treatment.

An example of the crosslinking treatment after dyeing is a method for immersing the dyed polyvinyl alcohol-based resin film in a boric acid-containing aqueous solution. The crosslinking treatment may be performed once or a plurality of times.

Examples of the water-washing treatment after crosslinking include immersing in water the polyvinyl alcohol-based resin film crosslinked after dyeing, spraying water as a shower, and a combination of immersing and spraying. After the water-washing treatment, the polyvinyl alcohol-based resin film may be dried by a known method.

The K-type polarizing film composed of a polyvinyl alcohol-based resin in which a polyvinyl alcohol resin is dehydrated to form a light-absorbing vinylene block segment in a polymer can be produced by, for example, a method including a step of uniaxially stretching a polyvinyl alcohol-based resin film, a step of dehydrating the polyvinyl alcohol-based resin film, a step of crosslinking the dehydrated polyvinyl alcohol-based resin film with a crosslinking liquid such as an aqueous boric acid solution, and a step of water-washing the polyvinyl alcohol-based resin film. The raw material film is as described above.

The uniaxial stretching of the polyvinyl alcohol-based resin film can be performed at various stages. The uniaxial stretching may be performed, for example, before the dehydration treatment, simultaneously with the dehydration treatment, or simultaneously with or before or after the boric acid crosslinking after the dehydration treatment. Also, the uniaxial stretching may be performed in a plurality of these stages. The method for uniaxial stretching is as described above.

An example of the method for dehydrating the polyvinyl alcohol-based resin film is exposing the polyvinyl alcohol-based resin film to an acid having a pH of 3 or more and then heating the exposed film. Specifically, the polyvinyl alcohol-based resin film can be immersed in deionized water for about 1 second to about 5 minutes and then immersed in an acid having a pH of 3 or more for a desired time. The polyvinyl alcohol-based resin film can also be exposed to a dehydration catalyst by a different method. For example, the film may be dipped or immersed in an aqueous dehydration catalyst for a sufficient retention time to diffuse the catalyst into the film.

The acid used for the dehydration treatment can be any acid having a pH of 3 or more and capable of removing hydrogen atoms and oxygen atoms from the hydroxylated portion of the linear polymer in the presence of heat or other appropriate treatment conditions to leave a conjugated vinylene unit. Specific examples of the acid include hydrochloric acid, hydrobromic acid, hydroiodic acid, phosphoric acid, and sulfuric acid. These acids may be diluted with water or alcohol such as methanol.

After the polyvinyl alcohol-based resin film was exposed to the dehydration catalyst, the polyvinyl alcohol-based resin film and the adsorption catalyst can be heated so that a part of the oriented film is converted into polyvinylene which is a desired dehydrated product. The film can be heated by conductive heating, convective heating, radiation heating, or a combination thereof. For example, the film and the catalyst can be passed through a heating oven at a temperature range of about 88° C. to about 205° C. for about a few seconds to about 10 minutes. In another method, the film and the catalyst can be exposed to microwave radiation heating, laser heating, or infrared radiation heating.

In the dehydration treatment step, a part of the vinyl alcohol-based polymer in the polyvinyl alcohol-based resin film is converted into a polarizing molecule of a block copolymer of poly(vinylene-co-vinyl alcohol). The effect of the dehydration treatment is to form a conjugated polyvinylene block from a polyvinyl alcohol block. By orienting the PVA matrix in one direction, the transition moment of the conjugated polyvinylene block is also oriented, and the material becomes visibly dichroic.

An example of the crosslinking treatment after the dehydration treatment is a method of immersing the dehydrated polyvinyl alcohol-based resin film in a boric acid-containing aqueous solution. Specifically, the dehydrated polyvinyl alcohol-based resin film can be brought into contact with an aqueous boric acid solution having a concentration of 10 to 20% at a temperature of 85 to 95° C.

An example of the water-washing treatment after the crosslinking is immersing in water the polyvinyl alcohol-based resin film crosslinked after the dehydration treatment, spraying water as a shower, or a combination of immersing and spraying. After the water-washing treatment, the polyvinyl alcohol-based resin film may be dried by a known method.

The thickness of the polarizing film is not particularly limited but preferably 50 μm or less, more preferably 30 μm or less, and further preferably 25 μm or less. The thickness of the polarizing film is usually 1 μm or more and preferably 3 μm or more.

[Bonding Layer]

The bonding layer is composed of a molecular bonding agent using a molecular bonding technique of bonding the polarizing film and the support substrate by a chemical bond. The molecular bonding technique is a technique of bonding members by a chemical bond with one or several molecular layers and, for example, converting a surface of an adherend into a surface of one type of functional group to achieve bonding by a bond with this functional group.

The molecular bonding agent preferably contains a triazine derivative having a functional group that bonds the polarizing film and the support substrate by a chemical bond. The bonding layer composed of the molecular bonding agent that contains a triazine derivative preferably contains a triazine derivative as a main component. Here, the "main component" means that the constituent ratio in the components constituting the bonding layer is 50 wt % or more, preferably 60 wt % or more, more preferably 80 wt % or more, further preferably 90 wt % or more, and particularly preferably 95 wt % or more.

The triazine derivative is preferably a compound that contains two or more OH groups and/or OH-generating groups and one triazine ring. The triazine derivative that contains two or more OH groups and/or OH-generating groups and one triazine ring forms a bonding layer in which the OH groups on the surface of the support substrate and/or the OH groups on the surface of the polarizing film are chemically bonded with the OH groups or OH-generating groups of the triazine derivative by dehydration condensation. As the triazine derivative, a conventionally known compound can be used. The OH groups or OH-generating groups are preferably alkoxysilyl groups.

The molecular bonding agent may contain components other than the triazine derivative within a scope that does not impair the effects of the present invention. Examples of the components other than the triazine derivative include a crosslinking agent, fine particles, an ultraviolet absorber, an antifoaming agent, a thickener, a dispersant, a surfactant, a catalyst, a lubricant, and an antistatic agent.

The thickness of the bonding layer is not particularly limited but, for example, preferably 5 μm or less and 0.001 μm or more, more preferably 1 μm or less and 0.001 μm or more, further preferably 0.1 μm or less and 0.005 μm or more, and particularly preferably 0.05 μm or less and 0.01 μm or more. The thickness of the bonding layer is preferably thin from the viewpoint of efficiently dissipating the heat generated in the polarizing film to the outside and suppressing an increase in temperature of the polarizing film. However, if the surface properties of the adherend are poor, the OH groups or the OH groups generated from the OH-generating groups of the triazine derivative present on the surface of the polarizing film and/or the support substrate are less likely to come into contact with the other surface. Therefore, the thickness of the bonding layer may be appropriately designed in consideration of these conditions.

Although dehydration condensation may occur even with the OH groups on the surface of the support substrate and the OH groups on the surface of the polarizing film, the contact area of each surface is small because of the influence of the surface roughness of both surfaces, and thus the adhesion force is extremely low. When the thickness of the bonding layer is 0.05 μm or less and 0.01 μm or more, the surface roughness of the support substrate and the polarizing film can be filled, so that the contact area is increased, which is advantageous for bonding strength.

[Support Substrate]

The support substrate supports the polarizing film that easily cracks and that is difficult to handle as a single body, facilitates handling of the polarizing film, protects the polarizing film, and is composed of a material having translucency to visible light. The translucency as described herein means that the total light transmittance is 80% or more, preferably 85% or more, and more preferably 90% or more. The light transmittance can be measured using a spectrophotometer (UV-visible-near infrared spectrophotometer "V-570" manufactured by JASCO Corporation) in accordance with JIS K 0115.

Examples of the material having translucency to visible light include an organic material, an inorganic material, and an organic-inorganic hybrid material. Examples of the organic material include polyolefin resins such as triacetyl cellulose, diacetyl cellulose, polyester resin, polyimide resin, polyamide, polyethylene, and polypropylene, cycloolefin resins such as a cycloolefin polymer and a cycloolefin copolymer, polyether sulfone, polysulfone, polyvinyl chloride, acrylic resin, polycarbonate resin, and urethane resin. Examples of the inorganic material include fluoride glass such as silicate glass, borosilicate glass, titanium silicate glass, and zirconium fluoride, fused quartz, quartz crystal, sapphire, YAG crystal, fluorite, magnesia, and spinel (MgO·Al$_2$O$_3$). An example of the organic-inorganic hybrid material is a resin composed of a silsesquioxane derivative having an organic functional group such as a (meth)acryloyl group.

From the viewpoint of efficiently dissipating the heat generated in the polarizing film to the outside and suppressing thermal shrinkage of the polarizing film, the support substrate laminated on at least one surface of the polarizing film preferably has a higher thermal conductivity than the polarizing film. The thermal conductivity is, for example, preferably 0.7 W/mK or more, more preferably 1 W/mK or more, and further preferably 5 W/mK or more. Examples of such a material include sapphire (thermal conductivity: 40 W/mK) and quartz crystal (thermal conductivity: 8 W/mK).

The thickness of the support substrate is not particularly limited and may be appropriately designed so as to facilitate handling of the polarizing film and protect the polarizing film. For example, the thickness is 10 to 3000 μm, preferably 20 to 1500 μm, and more preferably 30 to 1000 μm.

Various functional layers may be formed on the surface of the support substrate as necessary. Examples of the functional layers include a conductive layer, an antistatic layer, an antiglare (non-glare) layer, an antifouling layer (such as a photocatalyst layer), an antireflection layer, a hard coat layer, an ultraviolet shielding layer, a heat ray shielding layer, an electromagnetic wave shielding layer, and a gas barrier layer.

[Method for Producing Polarizing Plate]

Next, a method for producing a polarizing plate will be described. The method for producing a polarizing plate includes: a step of providing a molecular bonding agent on a surface of a polarizing film composed of a polyvinyl alcohol-based resin and/or a translucent support substrate; a step of laminating the polarizing film and/or the support substrate through the molecular bonding agent present on the surface of the polarizing film and/or the support substrate; and a step of thermocompression-bonding the polarizing film and the support substrate to bond the polarizing film and the support substrate by a chemical bond.

<Step 1: Preparation>

First, the above-described polarizing film and support substrate are prepared. The polarizing film and support substrate may be either long or sheet-like. The surfaces of the polarizing film and the support substrate may be cleaned as necessary by, for example, a washing treatment with a washing agent such as ethanol or acetone. The surfaces of the polarizing film and the support substrate may be subjected to an activation treatment as necessary by, for example, an ultraviolet irradiation treatment, a corona discharge treatment, or a plasma treatment.

Also, there is prepared a solution or a dispersion liquid in which the above-described molecular bonding agent is dissolved. The molecular bonding agent may be diluted with a solvent. Examples of the solvent include water, alcohol (for example, methanol, ethanol, isopropanol, ethylene glycol, propylene glycol, cellosolve, and carbitol), ketone (for example, acetone, methyl ethyl ketone, cyclohexanone), aromatic hydrocarbon (for example, benzene, toluene, and xylene), aliphatic hydrocarbon (for example, hexane, octane, decane, dodecane, and octadecane), ester (for example, ethyl acetate, methyl propionate, and methyl phthalate), ether (for example, tetrahydrofuran, ethyl butyl ether, and anisole), and a mixture thereof. The content of the triazine derivative may be appropriately set in consideration of coating work and the like and is, for example, 0.0001 to 10 wt %, preferably 0.001 to 3 wt %, and more preferably 0.01 to 2 wt %.

<Step 2: Coating>

The molecular bonding agent is provided on the surface of the polarizing film and/or the support substrate. Specifically, this is achieved by coating the surface of the polarizing film and/or the support substrate with a solution in which the above-described molecular bonding agent is dissolved.

Thereafter, drying is performed as necessary to volatilize the solvent, so that the molecular bonding agent remains on the surface of the polarizing film and/or the support substrate. The coating method is not particularly limited, and a known method can be employed. Examples of the known method include a wire bar coating method, a dip method, a spray method, a spin coating method, a roll coating method, a gravure coating method, an air knife coating method, a curtain coating method, a slide coating method, an extrusion coating method, and a die coating method. The drying method is not particularly limited, and a known method can be adopted.

<Step 3: Lamination>

After the molecular bonding agent was provided on the surface of the polarizing film and/or the support substrate, these are laminated through the molecular bonding agent present on the surface of the polarizing film and/or the support substrate. Specifically, this is achieved by laminating such that the surfaces of the polarizing film and/or the support substrate coated with the solution in which the molecular bonding agent is dissolved face each other.

<Step 4: Thermocompression-Bonding>

Subsequently, the polarizing film and the support substrate are thermocompression-bonded to be integrally bonded by a chemical bond. Specifically, this is achieved by heating in a state in which a pressing force is allowed to act on the polarizing film toward the support substrate, heating in a state in which a pressing force is allowed to act on the support substrate toward the polarizing film side, or heating in a state in which a pressing force is allowed to act on each of the polarizing film and the support substrate.

The pressing force is a pressing force with which the OH groups or the OH groups generated from the OH-generating groups of the triazine derivative present on the surface of the polarizing film and/or the support substrate are brought into contact with the other surface. The pressing force is, for example, preferably 0.01 to 50 MPa, more preferably 0.1 to 20 MPa, further preferably 0.5 to 10 MPa, and particularly preferably 0.5 to 5 MPa. The action time is, for example, 0.1 to 200 minutes. Thus, even if there are minute irregularities on the surfaces of the polarizing film and the support substrate, the polarizing film and the support substrate are accordingly deformed, and the OH groups of the triazine derivative present on these surfaces reach the other surface and are bonded thereto. That is, the polarizing film and the support substrate are firmly bonded by a chemical bond (reaction) by the triazine derivative. The heating temperature is a temperature at which the chemical reaction of the triazine derivative is promoted. The heating temperature is, for example, 30 to 300° C., preferably 50 to 250° C., more preferably 70 to 200° C., and further preferably 80 to 150° C.

EXAMPLES

Hereinafter, the present invention will be described in further detail by Examples. It is noted that the present invention is not limited to the following Examples.

Example 1

First, a 25 μm-thick iodine-based polarizing film having a surface protective film laminated thereon was prepared. The surface of the polarizing film opposite the surface having the surface protective film laminated thereon was washed with ethanol and dried. Thereafter, the surface was subjected to a corona discharge treatment. Also, a 0.7 mm-thick quartz crystal substrate was prepared. The quartz crystal substrate was ultrasonically washed in acetone (10 minutes) and dried. Thereafter, the surface was subjected to a corona discharge treatment. Subsequently, an ethanol solution that contains 0.1 wt % of a triazine derivative (product name: MB1015 aqueous solution, manufactured by Iou Chemical Laboratory Co., Ltd.) was applied on the corona discharge-treated surface of the polarizing film by a spin coating method (coating amount: 2 ml, spin rotation speed: 3000 rpm). Thereafter, the product was dried at room temperature to provide a triazine derivative on the surface of the polarizing film. In the same manner, an ethanol solution that contains 0.1 wt % of a triazine derivative (product name: MB1015 aqueous solution, manufactured by Iou Chemical Laboratory Co., Ltd.) was applied on the corona discharge-treated surface of the quartz crystal substrate by a spin coating method (coating amount: 2 ml, spin rotation speed: 3000 rpm). Thereafter, the product was placed in a hot air drying furnace and dried at 80° C. for 10 minutes to provide a triazine derivative on the surface of the quartz crystal substrate. Then, the surfaces of the polarizing film and the quartz crystal substrate on which the triazine derivative was provided were superimposed and thermocompression-bonded with a hot press machine (pressure: 5 MPa, temperature: 120° C., time: 20 minutes) to prepare a polarizing plate (surface protective film/iodine-based polarizing film/bonding layer/crystal quartz substrate).

Example 2

First, a 25 μm-thick iodine-based polarizing film having a surface protective film laminated thereon was prepared. The surface of the polarizing film opposite the surface having the surface protective film laminated thereon was washed with ethanol and dried. Thereafter, the surface was subjected to a corona discharge treatment. Also, a 0.7 mm-thick sapphire substrate was prepared. The sapphire substrate was ultrasonically washed in acetone (10 minutes) and dried. Thereafter, the surface was subjected to a corona discharge treatment. Subsequently, an ethanol solution that contains 0.1 wt % of a triazine derivative (product name: MB1015 aqueous solution, manufactured by Iou Chemical Laboratory Co., Ltd.) was applied on the corona discharge-treated surface of the polarizing film by a spin coating method (coating amount: 2 ml, spin rotation speed: 3000 rpm). Thereafter, the product was dried at room temperature to provide a triazine derivative on the surface of the polarizing film. In the same manner, an ethanol solution that contains 0.1 wt % of a triazine derivative (product name: MB1015 aqueous solution, manufactured by Iou Chemical Laboratory Co., Ltd.) was applied on the corona discharge-treated surface of the sapphire substrate by a spin coating method (coating amount: 2 ml, spin rotation speed: 3000 rpm). Thereafter, the product was placed in a hot air drying furnace and dried at 80° C. for 10 minutes to provide a triazine derivative on the surface of the sapphire substrate. Then, the surfaces of the polarizing film and the sapphire substrate on which the triazine derivative was provided were superimposed and thermocompression-bonded with a hot press machine (pressure: 5 MPa, temperature: 120° C., time: 20 minutes) to prepare a polarizing plate (surface protective film/iodine-based polarizing film/bonding layer/sapphire substrate).

Comparative Example 1

First, a 25 μm-thick iodine-based polarizing film having a surface protective film laminated thereon was prepared. The surface of the polarizing film opposite the surface having the surface protective film laminated thereon was washed with ethanol and dried. Thereafter, the surface was subjected to a corona discharge treatment. Also, a 0.7 mm-thick quartz crystal substrate was prepared. The quartz crystal substrate was ultrasonically washed in acetone (10 minutes) and dried. Thereafter, the surface was subjected to a corona discharge treatment. Then, an adhesive layer (thickness: 15 μm, NCF-211S, manufactured by Lintec Corporation) was bonded to the corona discharge-treated surface of the polarizing film, and the quartz crystal substrate was bonded to the surface of the adhesive layer opposite the polarizing film. The product was pressed with a hand roller to prepare a polarizing plate (surface protective film/iodine-based polarizing film/adhesive layer/quartz crystal substrate).

Comparative Example 2

First, a 25 μm-thick iodine-based polarizing film having a surface protective film laminated thereon was prepared. The surface of the polarizing film opposite the surface having the surface protective film laminated thereon was washed with ethanol and dried. Thereafter, the surface was subjected to a corona discharge treatment. Also, a 0.7 mm-thick quartz crystal substrate was prepared. The quartz crystal substrate was ultrasonically washed in acetone (10 minutes) and dried. Thereafter, the surface was subjected to a corona discharge treatment. Subsequently, an acrylate-based ultra-violet curable adhesive (product name: Loctite AA 3105, solid content: 100%, manufactured by Henkel Japan Ltd.) was applied on the corona discharge-treated surface of the polarizing film by a spin coating method (coating amount: 2 ml, spin rotation speed: 3000 rpm) to provide a coating layer. Then, the polarizing film and the quartz crystal substrate were superimposed through the coating layer and pressed with a hand roller. Thereafter, the quartz crystal substrate side was irradiated with ultraviolet light using an ultraviolet irradiation device such that the integrated light amount on the surface was 1000 mJ/cm$^2$. Accordingly, the ultraviolet curable adhesive was cured to prepare a polarizing plate (surface protective film/iodine-based polarizing film/ultra-violet curable adhesive layer/quartz crystal substrate).

The polarizing plates obtained in Examples 1 and 2 and Comparative Examples 1 and 2 were evaluated as follows. The evaluation results are illustrated in Table 1. In the following evaluation, the polarizing plate from which the surface protective film was peeled off was used.

(Evaluation of Durability)

Air was blown toward the polarizing plate (23 mm×20 mm) obtained in each of Examples and Comparative Examples, and the polarizing film side of the polarizing plate was irradiated with laser light (wavelength: 455 nm) using a laser irradiator for 2 minutes while air at a constant speed was blown to the polarizing plate. The temperature of the hottest location in the plane of the polarizing film was measured as the surface temperature of the polarizing film using thermography from the polarizing film side. The appearance of the polarizing film in the polarizing plate after laser irradiation and the projection image of the polarizing plate when a backlight was used were visually evaluated according to the following criteria.

It is noted that the polarizing plate was disposed such that the polarizing film absorbs the polarized light of the laser (the polarized light of the laser and the absorption axis of the polarizing film were parallel).

Good: No change in appearance and projection image.

Fair: Slight change (irregularities, wrinkles and the like) observed in appearance and slight change (distortion, unevenness) observed in projection image.

Poor: Change (irregularities, wrinkles and the like) observed in appearance and change (distortion, unevenness) observed in projection image.

Very poor: Remarkable change (irregularities, wrinkles and the like) observed in appearance and change (distortion, unevenness) observed in projection image.

TABLE 1

| | Example 1 | | Example 2 | | Comparative Example 1 | | Comparative Example 2 | |
|---|---|---|---|---|---|---|---|---|
| Laser irradiation intensity [W/cm$^2$] | Surface temperature [° C.] | Appearance & projection image | Surface temperature [° C.] | Appearance & projection image | Surface temperature [° C.] | Appearance & projection image | Surface temperature [° C.] | Appearance & projection image |
| 4.77 | 58 | Good | 36 | Good | 60 | Good | 60 | Good |
| 5.72 | 65 | Good | 38 | Good | 70 | Fair | 69 | Good |
| 6.76 | 74 | Good | 41 | Good | 80 | Poor | 79 | Good |
| 7.58 | 83 | Good | 46 | Good | 90 | Poor | 90 | Fair |
| 8.79 | 94 | Fair | 46 | Good | 100 | Very poor | 99 | Fair |
| 9.57 | 99 | Fair | 48 | Good | 110 | Very poor | 107 | Poor |

As illustrated in Table 1, the polarizing plate of Example 1 obtained by bonding with the molecular bonding agent using a molecular bonding technique of bonding the polarizing film and the quartz substrate by a chemical bond demonstrated the result that the surface temperature of the polarizing film after laser irradiation was lower than those of the polarizing plates according to Comparative Examples 1 and 2 and the result that the polarizing film after laser irradiation had excellent appearance and projection images. Also, as illustrated in Table 1, the polarizing plate of Example 2 obtained by bonding with the molecular bonding agent using a molecular bonding technique of bonding the polarizing film and the sapphire substrate by a chemical bond demonstrated the result that the surface temperature of the polarizing film was lower and the result that the polarizing plate after laser irradiation had more excellent appearance and projection images.

As described above, the polarizing plate bonded by the molecular bonding technique can reduce the thermal load on the PVA polarizing film and enables the support substrate and the polarizing film to firmly adhere to each other. This can suppress poor appearance caused by the thermal shrinkage of the PVA polarizing film and achieve the high durability of maintaining the performance of the PVA polarizing film for a long period of time. Therefore, the polarizing plate bonded by the molecular bonding technique is particularly useful in applications using a light source having a large or high numerical value in light flux, luminous intensity, luminance, light density, and the like.

LIST OF REFERENCE SIGNS

1 Polarizing plate
2 Polarizing film
3 Bonding layer
4 Support substrate

The invention claimed is:

1. A polarizing plate comprising:
a polarizing film including a polyvinyl alcohol-based resin; and
a translucent support substrate laminated on at least one surface of the polarizing film through a bonding layer, wherein the bonding layer includes a molecular bonding agent that bonds the polarizing film and the support substrate by a chemical bond, the molecular bonding agent contains a triazine derivative that contains two or more OH groups and/or OH-generating groups and one triazine ring, the two or more OH groups and/or OH-generating groups are alkoxysilyl groups, and OH groups on a surface of the support substrate are chemically bonded with at least one of the alkoxysilyl groups of the triazine derivative by dehydration condensation, and OH groups on the surface of the polarizing film are chemically bonded with at least another one of the alkoxysilyl groups of the triazine derivative by dehydration condensation.

2. The polarizing plate according to claim 1, wherein the bonding layer has a film thickness of 5 μm or less and 0.001 μm or more.

3. The polarizing plate according to claim 1, wherein the support substrate is composed of one or more selected from an organic material, an inorganic material, and an organic-inorganic hybrid material.

4. The polarizing plate according to claim 1, wherein the support substrate has a thermal conductivity of 1 W/mK or more.

5. A method for producing the polarizing plate according to claim 1, comprising:
a step of providing the molecular bonding agent on the surface of the polarizing film and/or the support substrate;
a step of laminating the polarizing film and/or the support substrate through the molecular bonding agent present on the surface of the polarizing film and/or the support substrate; and
a step of thermocompression-bonding the polarizing film and the support substrate to bond the polarizing film and the support substrate by a chemical bond.

* * * * *